(12) United States Patent
O'Dell et al.

(10) Patent No.: US 6,891,825 B1
(45) Date of Patent: May 10, 2005

(54) METHOD AND SYSTEM OF PROVIDING MULTI-USER ACCESS TO A PACKET SWITCHED NETWORK

(75) Inventors: Michael D. O'Dell, Oakton, VA (US); Louis A. Mamakos, Laurel, MD (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/469,506

(22) Filed: Dec. 22, 1999

(Under 37 CFR 1.47)

(51) Int. Cl.[7] .......................... H04L 12/66; H04L 12/28; H04J 3/04; H04M 11/00
(52) U.S. Cl. ..................... 370/352; 370/395.2; 370/535; 370/420; 379/93.04; 379/93.14; 379/93.17
(58) Field of Search .............................. 370/395.1, 396, 370/397, 395.2, 389, 400, 352, 419, 420, 464, 465, 353, 392

(56) References Cited

U.S. PATENT DOCUMENTS

| | | | | |
|---|---|---|---|---|
| 5,970,066 A | * | 10/1999 | Lowry et al. | 370/353 |
| 5,991,292 A | * | 11/1999 | Focsaneanu et al. | 370/352 |
| 6,243,377 B1 | * | 6/2001 | Phillips et al. | 370/354 |
| 6,304,578 B1 | * | 10/2001 | Fluss | 370/413 |
| 6,404,861 B1 | * | 6/2002 | Cohen et al. | 379/93.01 |
| 6,473,427 B1 | * | 10/2002 | Brodigan | 370/395 |
| 6,490,273 B1 | * | 12/2002 | DeNap et al. | 370/352 |
| 6,584,074 B1 | * | 6/2003 | Vasamsetti et al. | 370/352 |
| 6,597,689 B1 | * | 7/2003 | Chiu et al. | 370/354 |
| 6,636,505 B1 | * | 10/2003 | Wang et al. | 370/352 |
| 6,640,239 B1 | * | 10/2003 | Gidwani | 709/203 |

OTHER PUBLICATIONS

Mamakos,L. et al., "PPP Over the Ethernet 'PPPOE,'" Aug., 1998 (website) http:/www-rn.informatik.uni-bremen.de/home/ftp/doc/internet-drafts-carrel-info . . . .

Mamakos, L. et al., "IETF Internet Informational RFC 2516, A Method for Transmitting PPP Over Ethernet," Feb., 1999 (website) http://info.internet.isi.edu/in-notes/rfc/files . . . .

"Redback Networks White Paper PPP over Ethernet: A Comparison of Alternatives for . . . ," Sep., 1998 (website) http://www.redbacknetworks.com/.

"Redback Networks White Paper'PPP over Ethernet: A Differentiating Advantage for . . . , '" Sep., 1998 (website) http://www.redbacknetworks.com.

* cited by examiner

*Primary Examiner*—Hanh Nguyen

(57) ABSTRACT

An approach for providing multi-user access to a packet switched network via a shared Ethernet-based local area network (LAN) is disclosed. Multiple end user stations are connected to the LAN, in which each of end user stations executes a communication software. The communication software is based upon a communication protocol (e.g., Point-to-Point Protocol (PPP)) that establishes a point-to-point communication session. The end user stations generate packets based upon the communication protocol. In addition, each of the end user stations selectively encapsulates the communication protocol packets using the Ethernet-based LAN protocol. Further, attached to the LAN is a customer premise equipment (CPE), which transmits the encapsulated packets to a line terminating equipment, which according to one embodiment is a digital subscriber line (DSL) access multiplexer that is located in a central office. The line terminating equipment transports the multiple PPP sessions to a multiplexer/demultiplexer, which is located within a regional carrier's network. In one embodiment, the multiplexer/demultiplexer is an Asynchronous Transfer Mode (ATM) switch, which simultaneously transports the multiple PPP sessions over a single permanent virtual circuit (PVC); VPI/VCIs (Virtual Path Identifier/Virtual Connection Identifier) are mapped to the multiple PPP sessions. The multiple PPP sessions are terminated at a remote access server, which recovers and forwards the packets to a backbone router. Thereafter, the backbone router forwards the packets to the packet switched network.

25 Claims, 6 Drawing Sheets

METHOD AND SYSTEM OF PROVIDING MULTI-USER ACCESS TO A PACKET SWITCHED NETWORK

BACKGROUND OF THE INVENTION

1. Field of the Invention

The present invention relates to a telecommunication system, and is more particularly related to managing multiple communication sessions for access to a packet switched network.

2. Discussion of the Background

The phenomenal growth of the Internet has presented network service providers (NSPs) with the continual task of responding to the millions of users' demand for reliable and fast access service. The primary role of an NSP is to connect users, which may include residential as well as business users, to a larger network for the transport of these users' data. The term Internet Service Provider (ISP) generally pertains to a particular type of network service provider that concentrates on providing access to the global Internet.

The users' demand for greater speeds is driven largely by the advancements in Internet applications, such as video teleconferencing, streaming video, and audio broadcast. Further, the graphic intensive World Wide Web further fuels the desire for high-speed access, as most users are dissatisfied with the slow response time that attends traditional analog modems. Despite the purported speeds of 33 kbps and 56 kbps, the true throughput of these analog modems falls short of such rates.

To address the speed demands of users, NSPs have deployed various communication technologies: ISDN (Integrated Serviced Digital Network), DSL (Digital Subscriber Line), and cable modems. ISDN, which supports data rates of 64 kbps and 128 kbps, has been overshadowed by the development of DSL technology. DSL technology, which includes xDSL, ADSL (asymmetric DSL), RADSL (rate adaptive DSL) and the like, provides significantly higher data rates (in the Mbps range) at a lower cost. Cable modems have also been proposed as a high-speed access solution.

Separate from the issue of transport technology, communication protocols enable network elements to communicate, and thus, are a major consideration in the design of a networking infrastructure. It is important to integrate or, at minimum, accommodate such protocols when designing the architecture of the Internet service. One key suite of communication protocols is the Point-to-Point Protocol (PPP), which was developed by the Internet Engineering Task Force (IETF), and has become the de facto wide area network (WAN) link protocol. PPP enables the reliable communication between clients and servers by negotiating configuration options, such as throughput requirements and link authentication. In addition, routers, which form the core of the Internet, interconnect using PPP. In addition, PPP dynamically assigns IP (Internet Protocol) addresses. The robustness of PPP stems from the fact that it is independent from the WAN service, and therefore, can be adapted to many WAN protocols (e.g., frame relay, X.25, SONET, and etc.).

Concurrent with the development of Internet applications is the fact that Ethernet has emerged as the prevailing local area network (LAN) technology with respect to price and performance. The reduction in the cost of Ethernet technology has been substantial, whereby non-business consumers can readily setup an Ethernet-based LAN without viewing it as a significant investment. Because many homes have multiple computers, residential users find deploying an Ethernet-based LAN economically viable.

However, Internet access poses an interesting challenge to these residential users, namely, because an Ethernet-based LAN appears as a single dial-up user from the perspective of the ISP. Consequently, each of the PCs on the Ethernet-based LAN cannot be individually serviced with regard to individualized accounting and network selection. Another consideration is the ease of user installation. If the user is required to have a high level of sophistication for the successful establishment of a communication link with the ISP, then deployment of the service will not be wide spread. These considerations are further discussed below.

FIG. 6A shows a conventional system for residential access to the Internet. Sites A and B are residential locations and employ DSL technology to reach the central office (CO) 601. A user within site A utilizes a personal computer (PC) 603 that is connected to a DSL modem 605. The connection from PC 603 to the DSL modem 605 is typically through a communication port of the PC 603. Site B has two PCs 607 and 609 with two separate DSL modems 611 and 613, respectively. The modem connections for these PCs 607 and 609 are likewise through their respective communication ports.

The CO 601 possesses a DSL access multiplexer (DSLAM) 614, which aggregates traffic from the DSL modems 605, 611, and 613 for transport over a data network 615 to a remote access server 617 of an ISP 619. The remote access server 617 forwards the traffic to a backbone router 621 and onto the Internet 623. Site C utilizes a more traditional dial-up approach, whereby a PC 625 dials out to a Point-of-Presence (POP) of the ISP 619 using an analog modem 627. The POP is this conventional system is the CO 601. A voice switch 629 within the CO 601 switches the data from PC 625 to the public switched telephone network (PSTN) 631 to the remote access server 617 within ISP 619.

In each of the above scenarios, the PCs 603, 607, and 625 in sites A, B, and C are loaded with the PPP protocol suite for communication with the remote access server 617. It is apparent that each of the modems 605, 611, and 627 support a single PPP session. Accommodating multiple users, as in the case of site B, requires a corresponding increase in the number of DSL modems. One drawback of this solution is the high cost. At site C, for instance, PC 625 places a telephone call using the dial-up networking capabilities of Microsoft Windows 95/98; once the call is established, a data link session is established before any user data may be transferred. This data link session is typically a PPP session between PC 625 and the remote access server 617. As noted above, PPP authenticates the user, dynamically assigns an IP address, and negotiates various other connectivity parameters. When the PPP session is established, PC 625 is connected to the Internet 623.

FIG. 6B shows a conventional system for providing Internet access to a residential user with a LAN. The PCs 633 and 635 at site D communicate over a LAN 637. The LAN 637 connects to a DSL modem 614 to provide connectivity for PCs 633 and 635 to the Internet 623. As indicated previously, the ISP 619 views the LAN 637 behind DSL modem 641 as a single dial-up user. Given the system of FIG. 3, multiple PPP sessions cannot be simultaneously established from LAN 637 to remote access server 617. Another drawback concerns the fact that the ISP 619 cannot prevent the two PCs 633 and 635 from utilizing the same account for Internet access.

Although consumers of Internet services express a desire for greater access speeds (with such access technologies as DSL and cable modems), they are not willing or able to incur significant installation and configuration complexity in order to achieve faster Internet access. It is clear that to achieve rapid acceptance by consumers, broadband services must be easy to use.

In addition to ease-of-use, it is important that broadband services integrate into the current networking infrastructure as seamlessly and completely as possible, with minimal changes to existing equipment or operational systems. A broadband technology deployment that directly fits easily into an existing infrastructure would stimulate faster deployment by network service providers and greater acceptance by consumers.

Based on the foregoing, there is a clear need for improved approaches for provisioning services to support multiple users across a single connection.

There is also a need to simplify end-user configuration.

There is also a need to enable the dynamic selection of multiple services.

There is also a need to use a common customer premises equipment to serve multiple users.

There is also a need to avoid significant hardware and software upgrades or replacement.

There is also a need to reduce the cost of providing network services.

There is also a need to accommodate the existing cabling infrastructure in the deployment of data network services.

Based on the need to supply network services to a multitude of users, an approach for maintaining multiple point-to-point communication sessions that is independent of the access technology and distribution media is highly desirable.

SUMMARY OF THE INVENTION

According to one aspect of the invention, a method is provided for providing multi-user access to a packet switched network. The method includes executing a communication software on a plurality of end user stations that communicate over a local area network (LAN), which supports an Ethernet-based LAN protocol. The communication software is based upon a communication protocol that establishes a point-to-point communication session. The method also includes generating packets by the plurality of end user stations based upon the communication protocol. In addition, the method encompasses selectively encapsulating the communication protocol packets using the Ethernet-based LAN protocol. Further, the method includes transmitting the encapsulated packets by a customer premise equipment (CPE) that is coupled to the LAN and simultaneously carrying the point-to-point communication sessions over a communication channel. The method also includes terminating the point-to-point communication sessions at a remote access server and recovering the packets and forwarding the packets to the packet switched network. Under this approach, multiple users can be supported over a single connection, thereby reducing the cost of providing network services.

According to another aspect of the invention, a communication system for providing multi-user access to a packet switched network comprises a local area network (LAN) that supports an Ethernet-based LAN protocol. A plurality of end user stations are connected to the LAN, in which each of the plurality of end user stations executes a communication software that is based upon a communication protocol that establishes a point-to-point communication session. The plurality of end user stations generate packets based upon the communication protocol. Each of the plurality of end user stations selectively encapsulates the communication protocol packets using the Ethernet-based LAN protocol. A customer premise equipment (CPE) is coupled to the LAN and is configured to transmit the encapsulated packets. A line terminating equipment communicates with the CPE. A multiplexer/demultiplexer is coupled to the line terminating equipment and is configured to receive the point-to-point communication sessions. The multiplexer/demultiplexer simultaneously carries the point-to-point communication sessions over a communication channel. A remote access server communicates with the multiplexer/demultiplexer and is configured to terminate the point-to-point communication sessions. The remote access server recovers the packets and forwards the packets. A router is coupled to the remote access server and is configured to receive the packets. The router forwards the packets to the packet switched network. The above arrangement advantageously provides simplicity of user configuration.

In yet another aspect of the invention, an end user station-readable medium carrying one or more sequences of one or more instructions for providing multi-user access to a packet switched network is disclosed. The one or more sequences of one or more instructions include instructions which, when executed by one or more processors, cause the one or more processors to perform the step of executing a communication software on a plurality of end user stations that communicate over a local area network (LAN) that supports an Ethernet-based LAN protocol. The communication software is based upon a communication protocol that establishes a point-to-point communication session. Another step includes generating packets by the plurality of end user stations based upon the communication protocol. Another step includes selectively encapsulating the communication protocol packets using the Ethernet-based LAN protocol. Yet another step includes transmitting the encapsulated packets by a customer premise equipment (CPE) that is coupled to the LAN. This approach advantageously provides dynamic selection of network services.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes high-speed Internet access utilizing the existing infrastructure of the network service provider, regional carrier and the subscriber. Multiple end user stations within a residential site are attached to an Ethernet-based local area network (LAN). The LAN is further connected to a single customer premise equipment (CPE), such as a DSL modem, which is linked to a line terminating device (e.g., DSL access multiplexer (DSLAM)) that is located within a central office (CO). The end user stations are loaded with a PPPoE (Point-to-Point Protocol over Ethernet) software, which enables Ethernet encapsulation of PPP packets. The multiple PPP sessions that are established by the end user stations are carried over a permanent virtual circuit (PVC), or alternatively a switched virtual circuit (SVC), of an Asynchronous Transfer Mode (ATM) network and terminate at a remote access server of the network service provider. The remote access server communicates with a backbone router that forwards packets onto the Internet.

Although the present invention is discussed with respect to an ATM data network and DSL access technology, it should be appreciated that one of ordinary skill in the art would recognize that the present invention has applicability to other data networks (e.g., frame-based networks) and access technologies (e.g., cable modems and radio networks). Further, the discussion below focuses on PPP, it is understood that the present invention can be practiced with other equivalent data link protocols.

Figure 1:
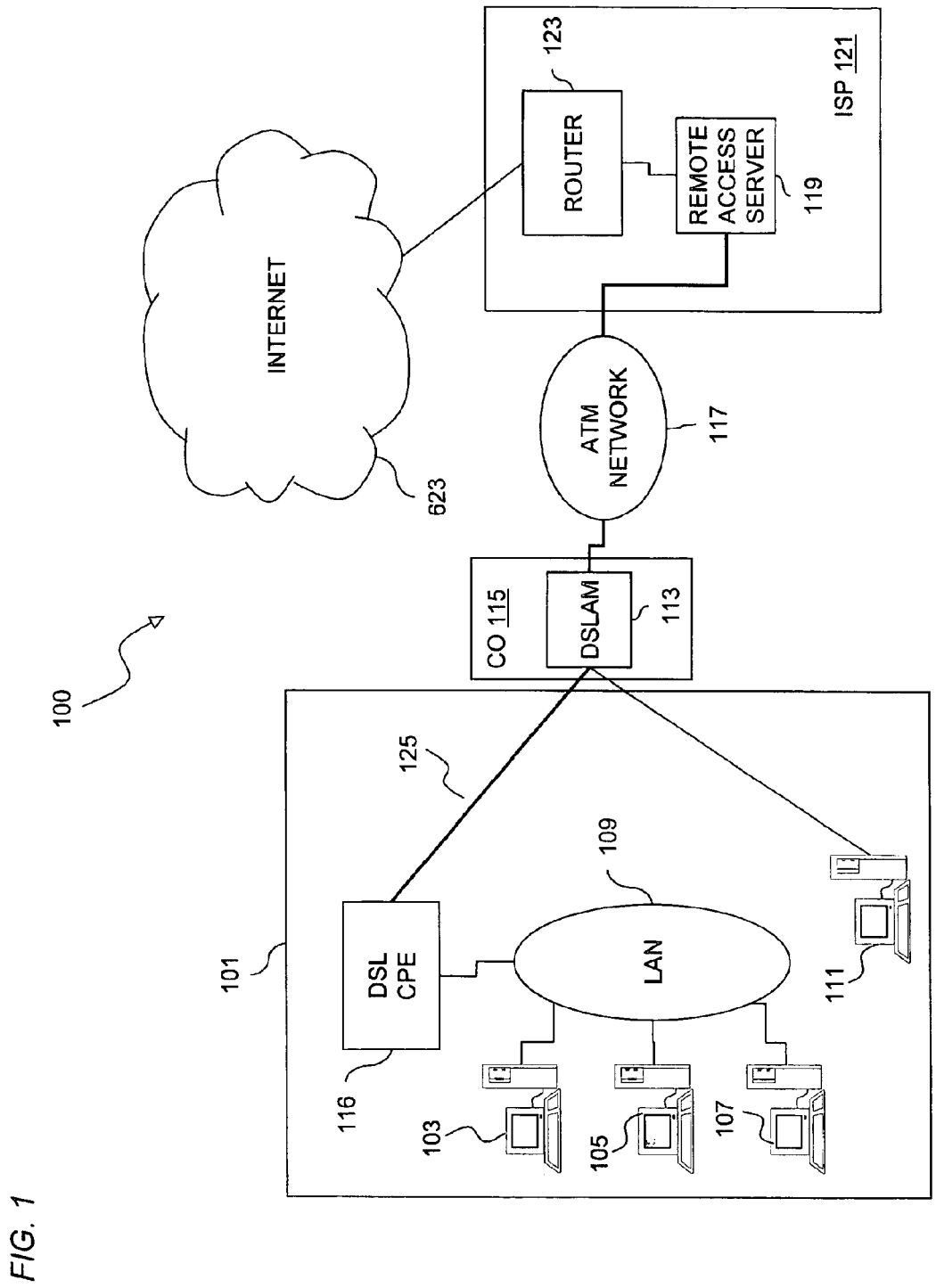
FIG. 1 is a block diagram of a communication system for high-speed Internet access, according to an embodiment of the present invention.

FIG. 1 shows a communications system for providing Internet access using broadband services in accordance with an embodiment of the present invention. The system 100 uses Ethernet and the point-to-point protocol (PPP) as the core technologies to enabling the users to establish multiple PPP sessions over a single CPE. In particular, PPP over Ethernet (PPPOE) specifies the encapsulation of PPP packets over Ethernet, as described in IETF RFC 2516, which is herein incorporated by reference in its entirety. The implementation of PPPoE does not require the end users to possess knowledge beyond that required for standard dial-up Internet access. The PPPoE can be implemented using legacy hardware and software; e.g., standard Ethernet NICs (Network Interface Cards), and standard DSL modems. In addition, no special configuration or provisioning of the customer premise modem or DSL access network. Furthermore, PPPOE provides independence of the access technology. That is, ISPs are free to use other broadband services, such as cable modems, radio networks, and Fiber To The Curb (FTTC).

Site 101 shows a residential subscriber (which may also be a small office) with three end user stations 103, 105, and 107 that are connected to a LAN 109. These end user stations may be desktop PCs, laptop computers, palm computers, or similar devices. Site 101 also has a stand alone end user station 111 with the capability to directly access the DSLAM 113 within CO 115. The DSLAM 113 is linked to an ATM (Asynchronous Transfer Mode) network 1117, which is maintained by a regional carrier or commercial local exchange carrier (CLEC). A virtual circuit is created in the ATM network 117 to transport traffic from the end user stations 103, 105, 107, and 111 to a remote access server 119 of the ISP 121. The virtual circuit can be a permanent virtual circuit (PVC) or a switched virtual circuit (SVC), depending on what is supported by the regional carrier or CLEC. It should be noted that a single PVC can support any number of PPP sessions. The operation of PPPoE in the DSL/ATM architecture is more fully described with respect to FIG. 2. The remote access server 119 recovers the data payload from Ethernet frame; the payload is the PPP packet. The remote access server 119 connects to a backbone router 123, which is attached to the Internet 623.

In the preferred embodiment, LAN 109 is an Ethernet-based LAN and is attached to a DSL CPE 116. The PVC is pre-assigned to the DSL CPE 116. Each of the end user stations 103, 105, and 107 has loaded within it a PPPoE client software, which does not alter the usual dial-up procedures associated with the Microsoft Windows 95/98/NT operating systems. Alternatively, the Ethernet Network Interface Cards (NICs) with end user stations 103, 105, and 107 can directly connect to the DSL CPE 116 (e.g., high-speed DSL modem). This scenario is ideal for residential users who do not have an Ethernet-based LAN, but have laptops with Ethernet NICs installed.

To access the Internet, the user on end user station 103, for example, can utilize the standard Microsoft Windows 95/98 dial-up networking capabilities to create a new PPP connection over the Ethernet-based LAN 109 to the DSL CPE 116. A "shim" is used between the Microsoft Windows 95/98 dial-up networking PPP stack and the Ethernet driver enabling PPP sessions to be carried directly in standard Ethernet frames. The DSL CPE 116 has the functionality to support Ethernet MAC (Media Access Control) bridging. As will be further discussed in FIG. 3, the encapsulation on the DSL line 125 is standard Ethernet bridged frames. As the DSL CPE 116 is pre-configured with a PVC that is coordinated with the regional carrier.

The PPP session over Ethernet that was initiated by end user station 103 is bridged by the DSL CPE 116 to an ATM PVC within the ATM network 117, which connects to the remote access server 119. The remote access server 119 is capable of terminating a DSL PPP session. Effectively, end user station 103 has established a connection similar in nature to the traditional dial-up approach; in contrast to the dial-up connection, the PPPoE session is accompanied by greater bandwidth. Moreover, the ISP 121 perceives the connection from end user station 103 as a standard PPP session because the PPP stack is not modified.

A key difference between the PPP dial-up solution and the present invention is the fact that the user can select a desired service from a variety of services. PPPoE as utilized in communication system 100 provides end users access to multiple network services, which is not possible with a conventional dial-up approach. This capability is referred to as dynamic service selection, which enables these end users to change destination networks on demand. Further, multiple sessions can be established with different networks simultaneously over a single DSL connection 125. In contrast to the traditional approach, in which the ISP detects the LAN 109 as a single user, this arrangement advantageously allows individual accounting information to be maintained with respect to each of the end user stations.

Figure 2:
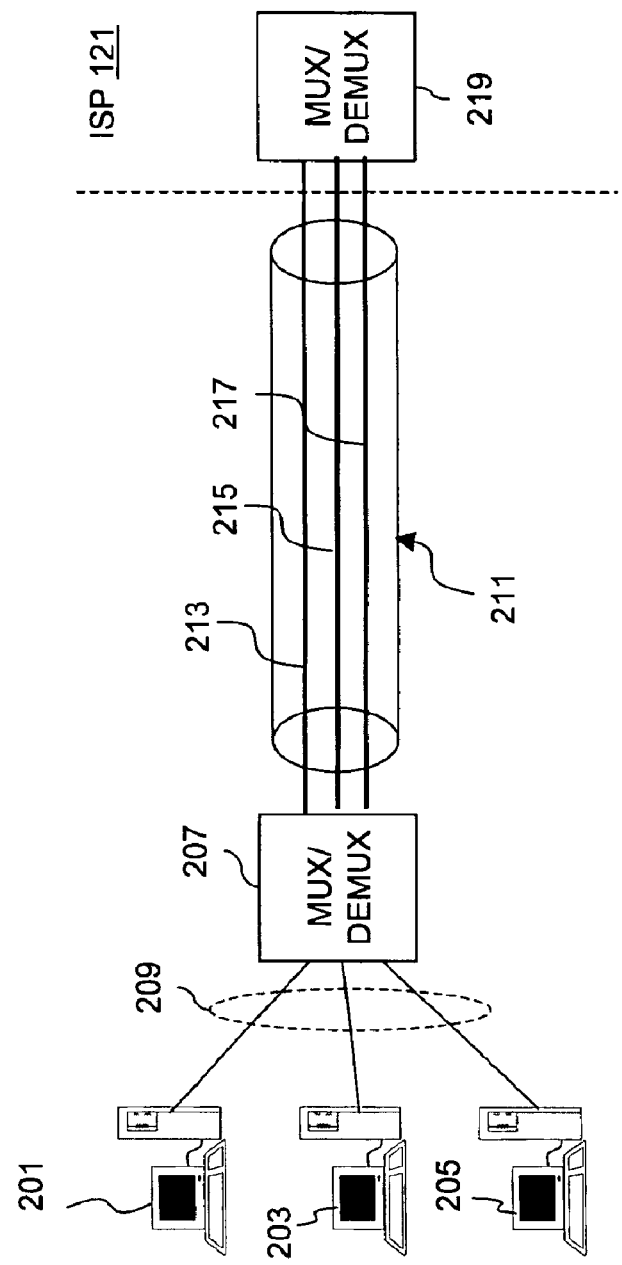
FIG. 2 is diagram illustrating the principles of PPP over Ethernet (PPPoE) in the system of FIG. 1.

FIG. 2 shows the operation of PPPoE over a shared connection, according to an embodiment of the present invention. From the above discussion, the PPPoE architecture in the communication system 100 advantageously permits use of existing networking infrastructure, thereby enabling rapid deployment of network services by ISP 121. In fact, because PPPoE is not dependent on a particular access technology, any network component that is capable of multiplexing and demultiplexing can be utilized. As shown in FIG. 2, each of the end user stations 201, 203, and 205 can transfer an PPP packet that has been encapsulated by an Ethernet frame to a MUX/DEMUX 207 over data paths 209.

MUX/DEMUX 207, according to the embodiment of FIG. 1, is an ATM switch. The ATM switch 207 resides within the ATM network 117. Each of the PPP sessions created by end user stations 201, 203 and 205 is assigned a unique VPI/VCI (Virtual Path Identifier/Virtual Connection Identifier), which is carried over a PVC 211. For example, the PPP sessions on end user stations 201, 203 and 205 correspond to VPI/VCIs 213, 215 and 217, respectively. The PVC 211 terminates at the MUX/DEMUX 219, which is a remote access server according to the embodiment of FIG. 1. One of ordinary skill in the art would recognize that any type of multiplexing and demultiplexing technology can be used for MUX/DEMUXs 207 and 219 so long as the PPP sessions can be resolved with respect to the end user stations 201, 203 and 205. For example, the MUX/DEMUXs 207 and 219 may employ time division multiplexing (TDM).

The above approach use of PPPoE advantageously minimizes user configuration and utilizes the PPP standard without modification. Further, this approach affords the end users the ability to use existing DSL modems, with minimal impact on the software of the end user stations.

Figure 3:
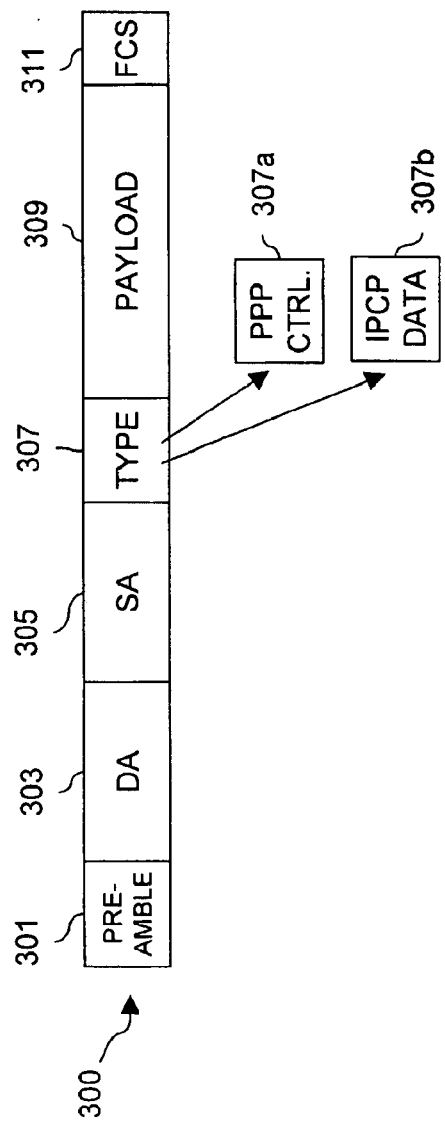
FIG. 3 is a diagram of an Ethernet Version 2 (V2) frame that supports PPPoE as utilized in the system of FIG. 1.

FIG. 3 shows an Ethernet V2 frame for use with PPP, according to an embodiment of the present invention. The Ethernet frame 300 possesses a single octet preamble field 301. The Ethernet frame 300 has a destination address (DA) field 303 and a source address (SA) field 305; both of these fields 303 and 305 are six octets in length. For PPP session traffic, the DA field 303 specifies the a peer's unicast address. The SA field 305 contains the MAC address of the source device. In addition, the Ethernet frame 300 includes a TYPE field 307, which is two octets in length. PPP over Ethernet uses two TYPE codes: (1) PPP control 307a for PPP control messages, and (2) IPCP (Internet Protocol Control Protocol) data 307b. The PAYLOAD field 309 contains data that may vary from 46–1500 octets. Further, a four octet frame check sequence (FCS) field 311 is used to detect bit errors. Although, the above discussion involves Ethernet V2, one of ordinary skill in the art would recognize that other Ethernet frame formats can be used, such as IEEE (Institute of Electrical and Electronics Engineers) 802.3.

To initiate a PPP session, the end user station 103, for example, sends aLCP (Link Control Protocol)-config-request message in a broadcast Ethernet frame using the PPP Control type code 307a. This frame is forwarded a standard MAC (Media Access Control) layer bridging modem. The device terminating the PPP session (e.g., remote access server 119) responds to this PPP message with the normal LCP response by unicasting this message back to the end user station 103 using the same frame format. The remote access server 119 maintains the binding between this local MAC address and the PPP session ID. LCP, PAP (Password Authentication Protocol)/CHAP (Challenge-Handshake Authentication Protocol), and IPCP control messages are unicasted between the two endpoints 103 and 119 in this manner until the PPP state machine reaches the normal data transfer stage. Data is then transferred using the IPCP Data Ethernet type code 307b. All PPP control and data packets are raw Ethernet encapsulated.

Figure 4:
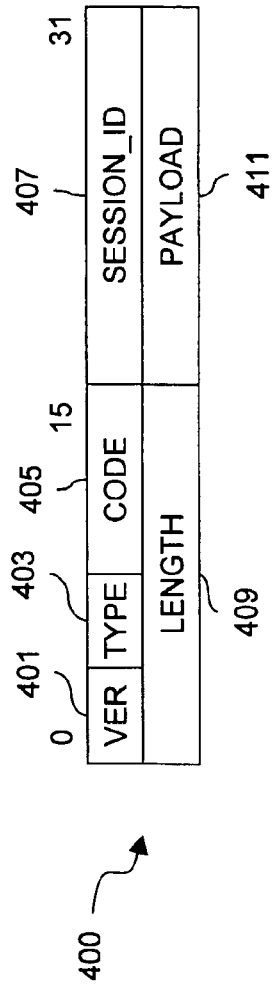
FIG. 4 is a diagram of the Ethernet payload for PPPoE as utilized in the system of FIG. 1.

FIG. 4 illustrates the Ethernet payload for PPPoE, in accordance with an embodiment of the present invention. The Ethernet payload 400 has a four-bit VER field 401 to specify the version of the PPPoE specification. The four-bit TYPE field 403 is set in accordance with the version of the PPPoE specification. The CODE field 405, which is one octet in length, is utilized in the Discovery and PPP Session stages. The SESSION_ID field 407 defines a PPP session between the source and destination devices and is two octets in length. The two octet LENGTH field 409 specifies the length of the PPPoE payload, exclusive of the length of the Ethernet or PPPoE headers. The actual data is contained in the PAYLOAD field 411.

Figure 5:
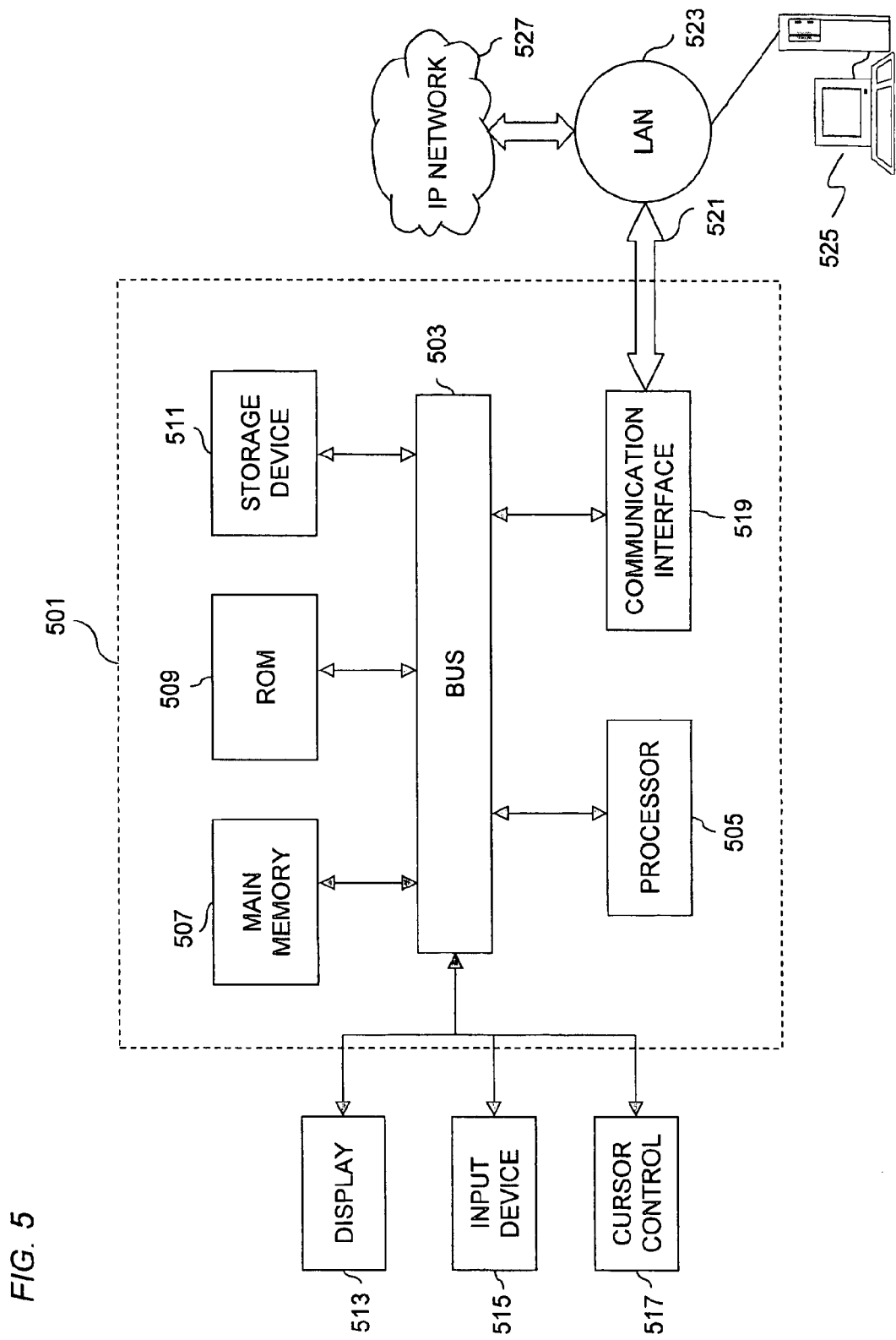
FIG. 5 is a diagram of a computer system that can execute PPPoE within the system of FIG. 1.
Figure 6A:
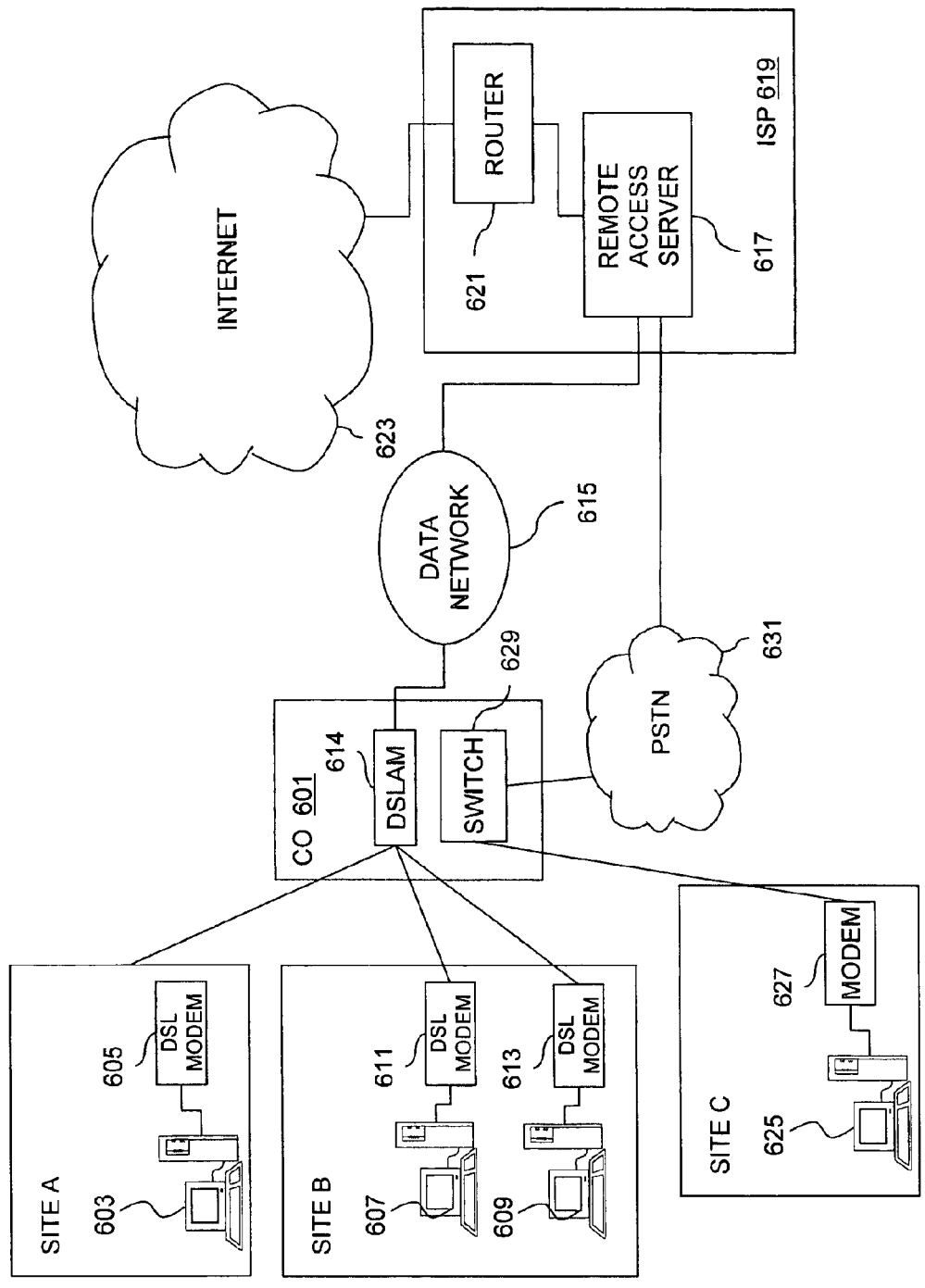
FIGS. 6A and 6B are diagrams of a conventional system for providing Internet access to residential users.
Figure 6B:
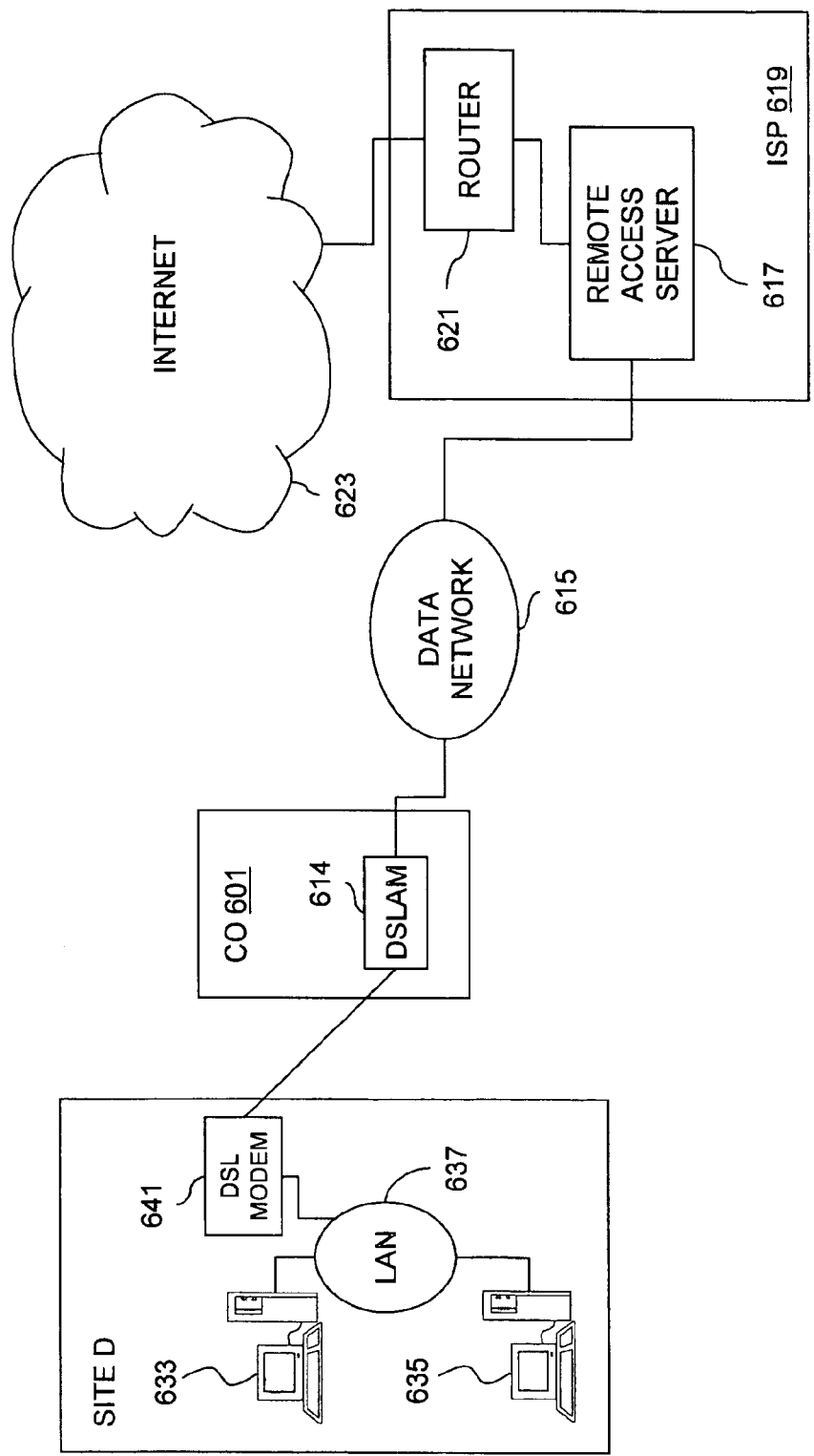

FIG. 5 illustrates a computer system 501 upon which an embodiment according to the present invention may be implemented. In particular, the computer system 501 executes the PPPoE software (i.e., shim). Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

According to one embodiment, the issuance of PPPoE messages is provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the PPPoE software may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to the transmission of PPPoE messages to control call processing remotely into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by a service provider, which provides data communication services through the IP network 527 (e.g., the Internet). LAN 523 and IP network 527 both use electrical, electromagnetic or optical signals that carry digital data streams. The signals through the various networks and the signals on network link 521 and through communication interface 519, which carry the digital data to and from computer system 501, are exemplary forms of carrier waves transporting the information. Computer system 501 can send PPPoE messages and receive data, including program code, through the network(s), network link 521 and communication interface 519.

The techniques described herein provide several advantages over prior approaches to deploying high-speed Internet access. The residential or small office subscribers can utilize their existing knowledge of dial-up networking to establish a PPPoE session. A single CPE supports multiple PPP sessions over one link, such as a DSL connection, to a line terminating device (e.g., DSLAM) within the CO. The multiple PPP sessions are carried over a single PVC or SVC in a regional carrier's ATM network; the multiple PPP sessions are mapped to specific VPI/VCIs to permit machine level granularity. Because the existing infrastructure of the network service provider can be used, speed of service deployment is enhanced, while minimizing cost for the network service provider as well as the subscriber.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for providing multi-user access to a packet switched network, the method comprising:
   executing a communication software on a plurality of end user stations that communicate over a local area network (LAN) supporting an Ethernet-based LAN protocol, the communication software being based upon a communication protocol that establishes a point-to-point communication session;
   generating packets by the plurality of end user stations based upon the communication protocol;
   selectively encapsulating the communication protocol packets using the Ethernet-based LAN protocol; and
   forwarding the encapsulated packets to a customer premise equipment (CPE) that is coupled to the LAN,
   wherein the point-to-point communication sessions are simultaneously carried over a communication channel and terminated at a remote access server, the point-to-point communication sessions corresponding respectively to a plurality of service providers, the packets being recovered and forwarded to the packet switched network, and wherein individual accounting information is processed for each of the plurality of end user stations based upon a selected one of the service providers.

2. The method according to claim 1, wherein the communication protocol in the executing step is Point-to-Point Protocol (PPP).

3. The method according to claim 1, wherein the CPE in the step of forwarding is a digital subscriber line (DSL) modem.

4. The method according to claim 1, wherein the communication channel is established over an Asynchronous Transfer Mode (ATM) network.

5. The method according to claim 4, wherein a Permanent Virtual Circuit (PVC) associated with the ATM network is assigned to the CPE.

6. The method according to claim 5, wherein the point-to-point communication sessions are mapped to distinct VPI/VCIs (Virtual Path Identifier/Virtual Connection Identifier).

7. The method according to claim 1, wherein the selection of the one service provider by each end user station is dynamic.

8. The method according to claim 1, wherein the packets conform with Ethernet V2 format.

9. A communication system for providing multi-user access to a packet switched network, the communication system comprising:
   a line terminating equipment communicating with a customer premise equipment (CPE) coupled to a local area network (LAN) providing connectivity to a plurality of end user stations, each of the end user stations executing a communication software that is based upon a communication protocol that establishes a point-to-point communication session, the plurality of end user stations generating encapsulated packets based upon the communication protocol, the point-to-point communication sessions corresponding respectively to a plurality of service providers;

a multiplexer/demultiplexer coupled to the line terminating equipment and configured to receive the point-to-point communication sessions, the multiplexer/demultiplexer simultaneously carrying the point-to-point communication sessions over a communication channel; and a remote access server communicating with the multiplexer/demultiplexer and configured to terminate the point-to-point communication sessions, the remote access server recovering the packets and forwarding the packets to the packet switched network, wherein the remote access server processes individual accounting information for each of the plurality of end user stations based upon a selected one of the service providers.

10. The system according to claim 9, wherein the communication protocol is Point-to-Point Protocol over Ethernet.

11. The system according to claim 9, wherein the CPE is a digital subscriber line (DSL) modem and the line terminating equipment is a DSL access multiplexer (DSLAM).

12. The system according to claim 11, wherein the multiplexer/demultiplexer is an Asynchronous Transfer Mode (ATM) switch.

13. The system according to claim 12, wherein the communication channel is a Permanent Virtual Circuit (PVC), the PVC being associated with the CPE.

14. The system according to claim 13, wherein the point-to-point communication sessions are individually mapped to distinct VPI/VCIs (Virtual Path Identifier/Virtual Connection Identifier).

15. The system according to claim 9, wherein each of the plurality of end user stations dynamically selects one of the service providers.

16. The system according to claim 9, wherein the packets conform with Ethernet V2 format.

17. A computer-readable medium carrying one or more sequences of one or more instructions for providing multi-user access to a packet switched network, the one or more sequences of one or more instructions including instructions which, when executed by one or more processors, cause the one or more processors to perform the steps of:

executing a communication software on a plurality of end user stations that communicate over a local area network (LAN) supporting an Ethernet-based LAN protocol, the communication software being based upon a communication protocol that establishes a point-to-point communication session corresponding to one of a plurality of service providers;

generating packets by the plurality of end user stations based upon the communication protocol;

selectively encapsulating the communication protocol packets using the Ethernet-based LAN protocol; and forwarding the encapsulated packets to a customer premise equipment (CPE) that is coupled to the LAN, wherein individual accounting information is processed for each of the plurality of end user stations based upon a selected one of the service providers.

18. The computer-readable medium according to claim 17, wherein the communication protocol in the executing step is Point-to-Point Protocol (PPP).

19. The computer-readable medium according to claim 17, wherein the CPE in the step of transmitting is a digital subscriber line (DSL) modem.

20. The computer-readable medium according to claim 17, wherein the selection of the one service provider by each end user station is dynamic.

21. The computer-readable medium according to claim 17, wherein the packets conform with Ethernet V2 format.

22. A method for supporting multi-user access to a data network, the method comprising:

receiving packets supporting a plurality of point-to-point communication sessions initiated respectively by a plurality of hosts, the packets being encapsulated by an Ethernet-type protocol, wherein the point-to-point communication sessions corresponding respectively to a plurality of service providers; and transmitting the encapsulated packets over a common communication channel to a line terminating device, wherein the line terminating device resolves the plurality of point-to-point communication sessions according to the respective hosts for accessing the data network, and wherein individual accounting information is processed for each of the plurality of hosts based upon a selected one of the service providers.

23. The method according to claim 22, wherein one of the point-to-point communication sessions corresponds to a first network service provider, and another one of the point-to-point communication sessions corresponds to a second network service provider.

24. A method for supporting multi-user access to network services, the method comprising:

receiving encapsulated packets from a single customer premise equipment that communicates with a plurality of hosts, each of the hosts being configured to establish point-to-point communication session for transport of the packets and to encapsulate the packets according to an Ethernet-type protocol; and communicating with an access server via a plurality of communication channels corresponding to the point-to-point communication sessions in response to the received encapsulated packets, the point-to-point communication sessions corresponding respectively to a plurality of service providers, wherein individual accounting information is processed for each of the plurality of hosts based upon a selected one of the service providers.

25. The method according to claim 24, wherein the selection of the one service provider by each of the hosts is dynamic.

* * * * *